(12) United States Patent
Tremblay

(10) Patent No.: US 7,941,758 B2
(45) Date of Patent: May 10, 2011

(54) ANIMATION OF GRAPHICAL OBJECTS

(75) Inventor: Christopher Tremblay, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 860 days.

(21) Appl. No.: 11/899,036

(22) Filed: Sep. 4, 2007

(65) Prior Publication Data
US 2009/0064012 A1    Mar. 5, 2009

(51) Int. Cl.
*G06F 3/048* (2006.01)

(52) U.S. Cl. ........ 715/765; 715/864; 715/781; 345/473; 345/169; 345/173

(58) Field of Classification Search .......... 715/700, 715/744, 764, 765, 781, 835, 846, 864, 866; 345/473, 169, 173
See application file for complete search history.

(56) References Cited

U.S. PATENT DOCUMENTS

| | | | |
|---|---|---|---|
| 5,379,057 A | | 1/1995 | Clough et al. |
| 5,675,362 A | | 10/1997 | Clough et al. |
| 6,130,679 A | * | 10/2000 | Chen et al. ............... 345/473 |
| RE37,418 E | * | 10/2001 | Tindell et al. ............. 715/202 |
| 6,469,723 B1 | * | 10/2002 | Gould et al. .............. 715/837 |
| 7,262,775 B2 | * | 8/2007 | Calkins et al. ............ 345/473 |
| 7,283,138 B2 | | 10/2007 | Tremblay |
| 2002/0191029 A1 | * | 12/2002 | Gillespie et al. .......... 345/810 |
| 2004/0036711 A1 | * | 2/2004 | Anderson ................. 345/701 |
| 2005/0140694 A1 | * | 6/2005 | Subramanian et al. .... 345/619 |
| 2005/0181349 A1 | * | 8/2005 | Bardige et al. ............ 434/362 |
| 2007/0165031 A1 | * | 7/2007 | Gilbert et al. ............. 345/473 |
| 2008/0158231 A1 | * | 7/2008 | Lee et al. .................. 345/473 |

OTHER PUBLICATIONS

Tremblay, Christopher, U.S. Appl. No. 11/899,033, filed Sep. 4, 2007.
Tremblay, Christopher, U.S. Appl. No. 11/899,166, filed Sep. 4, 2007.

* cited by examiner

*Primary Examiner* — Xiomar Bautista
(74) *Attorney, Agent, or Firm* — Fletcher Yoder PC

(57) ABSTRACT

A method for animating graphical objects is provided. In one embodiment, the method includes providing a plurality of graphical objects and displaying a subset of the objects in a viewport. In this embodiment, the method may also include calculating a virtual destination for one of the graphical objects based on a received user input, and moving the graphical object to the virtual destination over a period of time. Various additional methods, machine-readable media, and devices for animating graphical objects and controlling operational characteristics of a device are also provided.

18 Claims, 9 Drawing Sheets

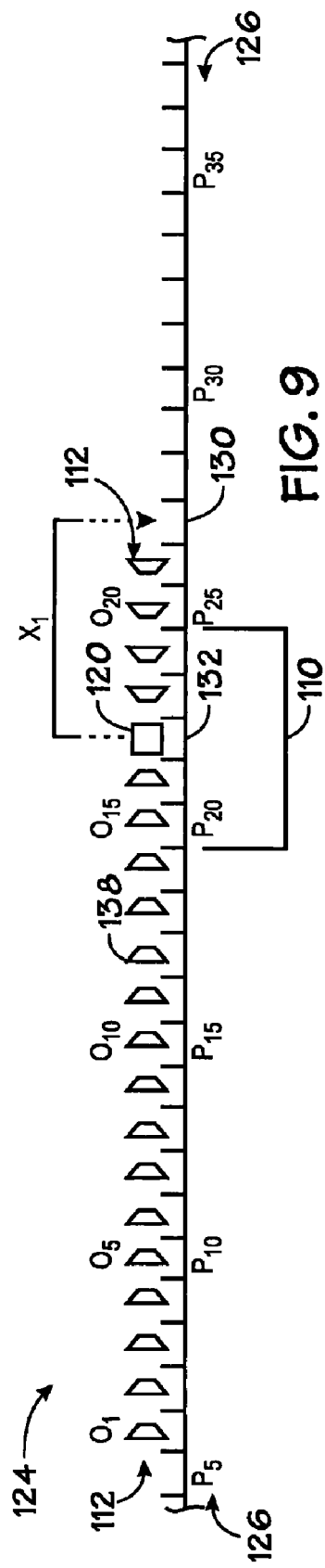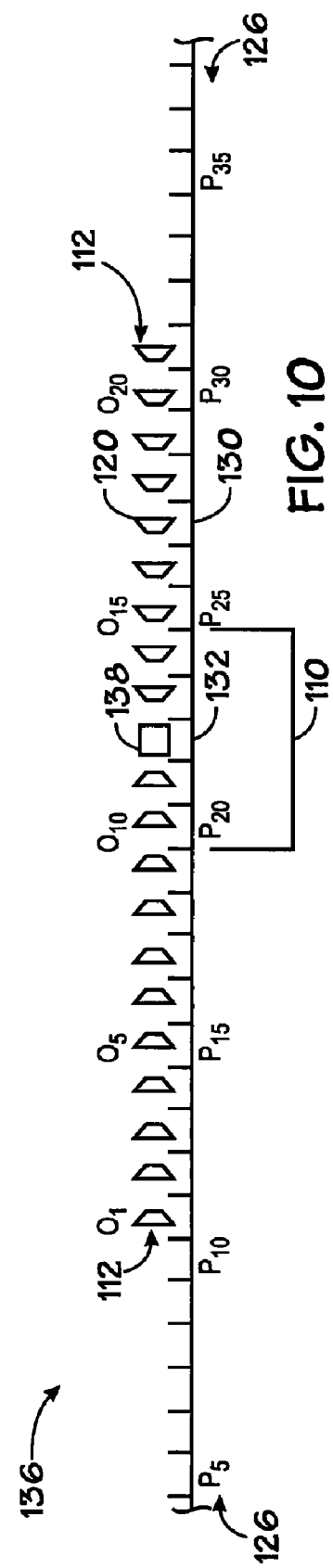

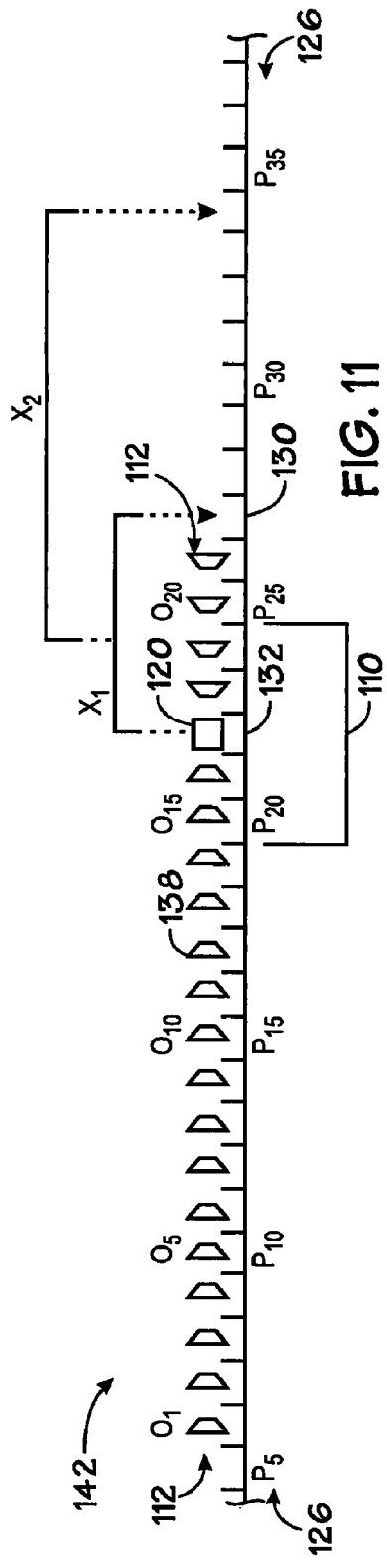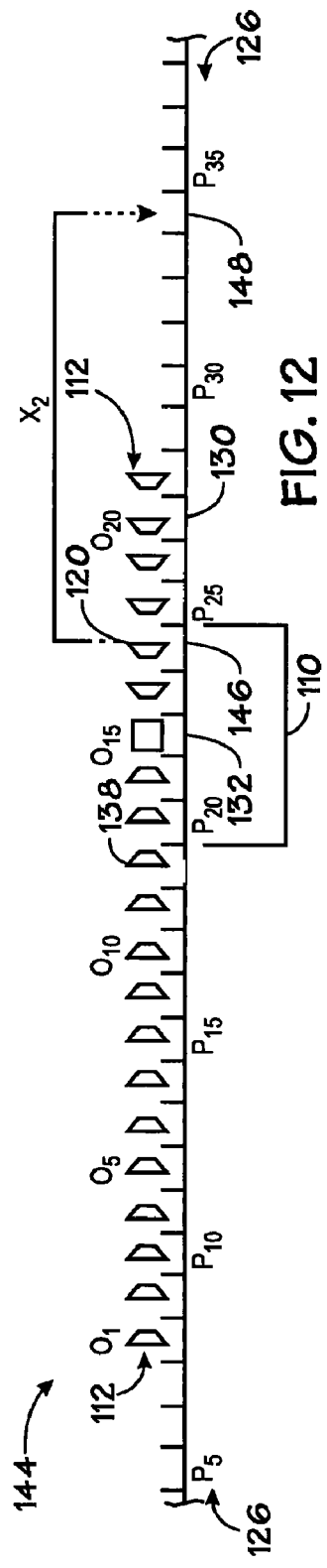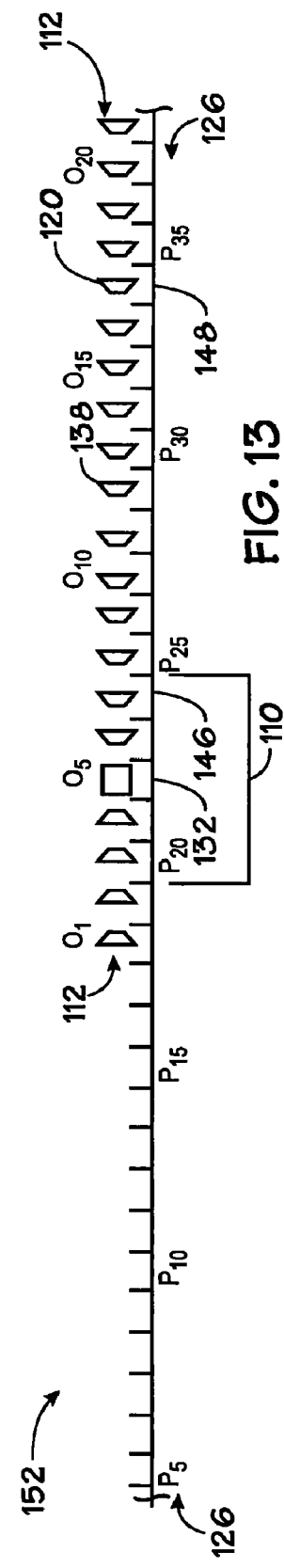

ANIMATION OF GRAPHICAL OBJECTS

BACKGROUND

1. Technical Field

The present invention relates generally to image processing and, more particularly, to the animation of graphical objects within graphical user interfaces.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Electronic devices and systems increasingly include display screens as part of the user interface of the device or system. As may be appreciated, display screens may be employed in a wide array of devices and systems, including desktop computer systems, notebook computers, and handheld computing devices, as well as various consumer products, such as cellular phones and portable media players. Such display screens may be useful for displaying status information about the device or for displaying information about an operation being performed by the device. For example, portable music and/or video players may display information about a music or video file being played by the device, such as the title of the song or video being played, the time remaining, the time elapsed, the artist or cast, or other information of interest. Alternatively, the display of such a device may display a piece of artwork or an arbitrary design during operation of the device.

In some instances, it may be desirable to show an image including one or more graphical objects on the display screen, and to allow a user to pan through a relatively large set of such graphical objects. Further, in some cases, the number of graphical objects may exceed that which may be conveniently displayed at one time. In these cases, the display screen may depict only a subset of the total number of graphical objects, and the particular displayed subset may change as a user pans through the total number of graphical objects. Further, the animation of images and graphical objects may consume a significant amount of memory and processing resources, which may negatively impact performance of the electronic device.

SUMMARY

Certain aspects of embodiments disclosed herein by way of example are summarized below. It should be understood that these aspects are presented merely to provide the reader with a brief summary of certain forms an invention disclosed and/or claimed herein might take and that these aspects are not intended to limit the scope of any invention disclosed and/or claimed herein. Indeed, any invention disclosed and/or claimed herein may encompass a variety of aspects that may not be set forth below.

The present disclosure generally relates to techniques for animating graphical objects and images, and for controlling other operational aspects of a device or system. In accordance with one disclosed embodiment, an exemplary method may include controlling and adjusting display characteristics of an image via one or more evaluators. Such display characteristics, in various embodiments, may include position, velocity, acceleration, size, and/or opacity, for example. In some embodiments, multiple evaluators may be incorporated into a rendering function to create complex visual animation effects of one or more graphical objects. In other embodiments, evaluators may be used to control other operational aspects of a device, such as a sound generated by the device. In accordance with another disclosed embodiment, an exemplary method may include displaying a portion of a set of images, and moving one or more of the images to a virtual destination in response to a user input. Further, in some embodiments, the virtual destination may be updated in mid-animation upon the receipt of an additional user input, facilitating a smooth animation of the object from its original position to the updated virtual destination.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

BRIEF DESCRIPTION OF THE DRAWINGS

These and other features, aspects, and advantages of the present invention will become better understood when the following detailed description of certain exemplary embodiments is read with reference to the accompanying drawings in which like characters represent like parts throughout the drawings, wherein:

FIG. 9 is a diagram generally illustrating a series of image objects in relative positions and the calculation of a virtual destination for a particular image object in accordance with one embodiment of the present invention;

FIG. 10 is a diagram illustrating the movement of the series of image objects of FIG. 9 such that the particular image object is located at its virtual destination in accordance with one embodiment;

FIG. 11 is a diagram generally illustrating a series of image objects and the calculation of a first virtual destination and a second, updated virtual destination for a particular image object in accordance with one embodiment of the present invention;

FIG. 12 is a diagram illustrating the position of the image objects of FIG. 11 at the time the second virtual destination is calculated in one embodiment of the present invention; and FIG. 13 is a diagram illustrating the movement of the series of image objects of FIGS. 11 and 12 such that the particular image object is located at its updated virtual destination in accordance with one embodiment of the present invention.

DETAILED DESCRIPTION OF SPECIFIC EMBODIMENTS

One or more specific embodiments of the present invention will be described below. These described embodiments are only exemplary of the present invention. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
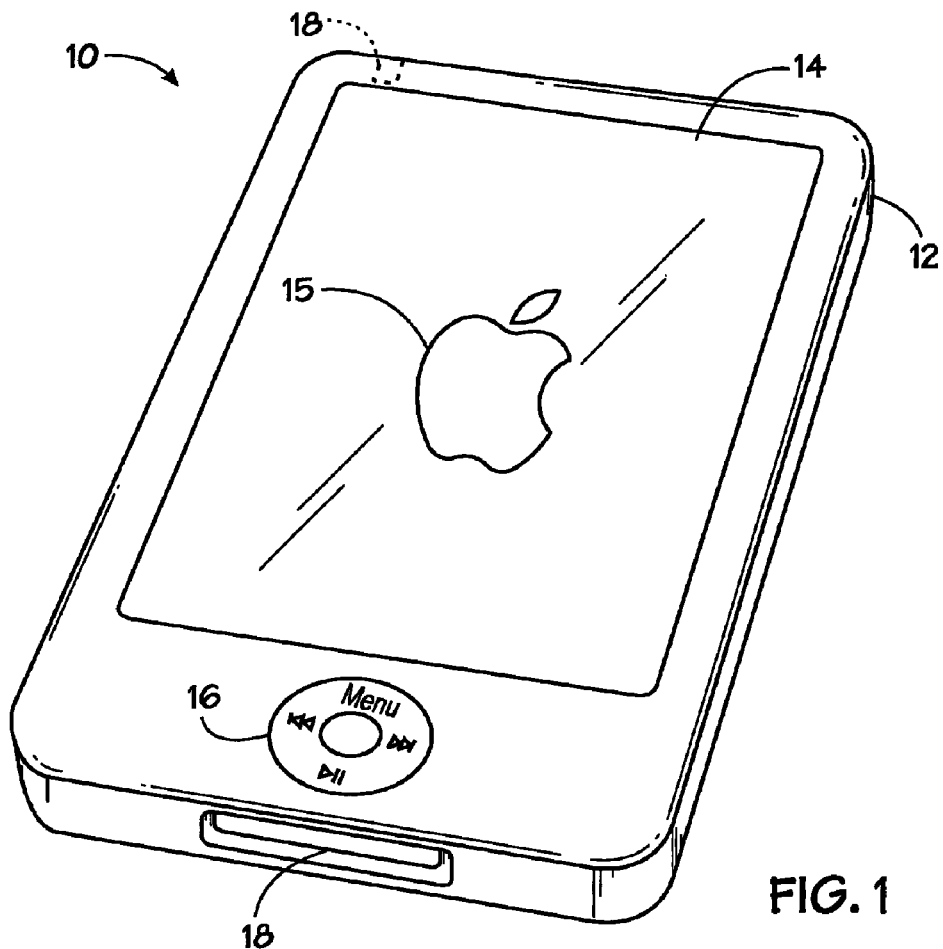
FIG. 1 is a perspective view illustrating a portable media player in accordance with one embodiment of the present invention.

An exemplary electronic device 10 is illustrated in FIG. 1 in accordance with one embodiment of the present invention. In some embodiments, including the presently illustrated embodiment, the device 10 may be a portable electronic device, such as a media player, a cellular phone, a personal data organizer, or the like. Indeed, in such embodiments, a portable electronic device may include a combination of the functionalities of such devices. In addition, the electronic device 10 may allow a user to connect to and communicate through the Internet or through other networks, such as local or wide area networks. For example, the portable electronic device 10 may allow a user to access the internet and to communicate using e-mail, text messaging, instant messaging, or using other forms of electronic communication. By way of example, the electronic device 10 may be a model of an iPod having a display screen or an iPhone available from Apple Inc.

In certain embodiments, the device 10 may be powered by one or more rechargeable and/or replaceable batteries. Such embodiments may be highly portable, allowing a user to carry the electronic device 10 while traveling, working, exercising, and so forth. In this manner, and depending on the functionalities provided by the electronic device 10, a user may listen to music, play games or video, record video or take pictures, place and receive telephone calls, communicate with others, control other devices (e.g., via remote control and/or Bluetooth functionality), and so forth while moving freely with the device 10. In addition, device 10 may be sized such that it fits relatively easily into a pocket or a hand of the user. While certain embodiments of the present invention are described with respect to a portable electronic device, it should be noted that the presently disclosed techniques may be applicable to a wide array of other, less portable, electronic devices and systems that are configured to render graphical data, such as a desktop computer.

In the presently illustrated embodiment, the exemplary device 10 includes an enclosure or housing 12, a display 14, user input structures 16, and input/output connectors 18. The enclosure 12 may be formed from plastic, metal, composite materials, or other suitable materials, or any combination thereof. The enclosure 12 may protect the interior components of the electronic device 10 from physical damage, and may also shield the interior components from electromagnetic interference (EMI).

The display 14 may be a liquid crystal display (LCD), a light emitting diode (LED) based display, an organic light emitting diode (OLED) based display, or some other suitable display. In accordance with certain embodiments of the present invention, the display 14 may display a user interface and various other images, such as logos, avatars, photos, album art, and the like. Additionally, in one embodiment, the display 14 may include a touch screen through which a user may interact with the user interface. The display may also include various function and/or system indicators to provide feedback to a user, such as power status, call status, memory status, or the like. These indicators may be incorporated into the user interface displayed on the display 14.

In one embodiment, one or more of the user input structures 16 are configured to control the device 10, such as by controlling a mode of operation, an output level, an output type, etc. For instance, the user input structures 16 may include a button to turn the device 10 on or off. Further the user input structures 16 may allow a user to interact with the user interface on the display 14. Embodiments of the portable electronic device 10 may include any number of user input structures 16, including buttons, switches, a control pad, a scroll wheel, or any other suitable input structures. The user input structures 16 may work with the user interface displayed on the device 10 to control functions of the device 10 and/or any interfaces or devices connected to or used by the device 10. For example, the user input structures 16 may allow a user to navigate a displayed user interface or to return such a displayed user interface to a default or home screen.

The exemplary device 10 may also include various input and output ports 18 to allow connection of additional devices. For example, a port 18 may be a headphone jack that provides for the connection of headphones. Additionally, a port 18 may have both input/output capabilities to provide for connection of a headset (e.g., a headphone and microphone combination). Embodiments of the present invention may include any number of input and/or output ports, such as headphone and headset jacks, universal serial bus (USB) ports, IEEE-1394 ports, and AC and/or DC power connectors. Further, the device 10 may use the input and output ports to connect to and send or receive data with any other device, such as other portable electronic devices, personal computers, printers, or the like. For example, in one embodiment, the device 10 may connect to a personal computer via an IEEE-1394 connection to send and receive data files, such as media files.

Figure 2:
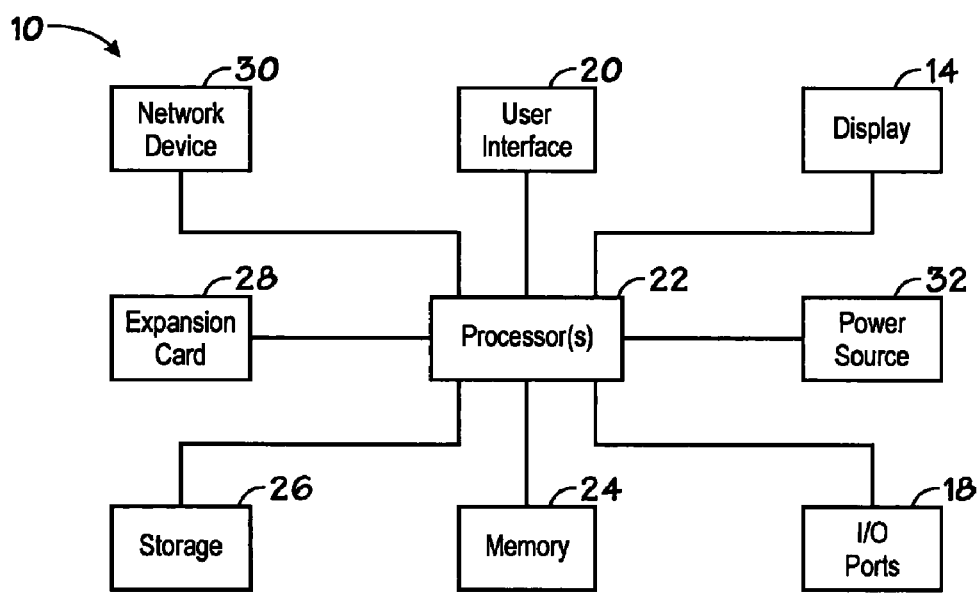
FIG. 2 is a simplified block diagram of the portable media player of FIG. 1 in accordance with one embodiment of the present invention.

Additional details of the illustrative device 10 may be better understood through reference to FIG. 2, which is a block diagram illustrating various components and features of the device 10 in accordance with one embodiment of the present invention. In the presently illustrated embodiment, the device 10 includes the display 14 and the I/O ports 18 discussed above. In addition, as discussed in greater detail below, the exemplary device 10 may include a user interface 20, one or more processors 22, a memory device 24, a non-volatile storage 26, card interface(s) 28, a networking device 30, and a power source 32.

As discussed further herein, the user interface 20 may be displayed on the display 14, and may provide a means for a user to interact with the electronic device 10. The user interface may be a textual user interface, a graphical user interface (GUI), or any combination thereof, and may include various layers, windows, screens, templates, elements, or other components that may be displayed in all or in part of the display 14. The user interface 20 may, in certain embodiments, allow a user to interface with displayed interface elements via one or more user input structures 16 and/or via a touch sensitive implementation of the display 14. In such embodiments, the user interface provides interactive functionality, allowing a user to select, by touch screen or other input structure, from among options displayed on the display 14. Thus the user can operate the device 10 by appropriate interaction with the user interface 20.

The processor(s) 22 may provide the processing capability required to execute the operating system, programs, user interface 20, and any other functions of the device 10. The processor(s) 22 may include one or more microprocessors, such as one or more "general-purpose" microprocessors, one or more special-purpose microprocessors and/or ASICS, or some combination thereof. For example, the processor 22 may include one or more reduced instruction set (RISC) processors, such as a RISC processor manufactured by Samsung, as well as graphics processors, video processors, and/or related chip sets.

As noted above, embodiments of the electronic device 10 may also include a memory 24. The memory 24 may include a volatile memory, such as random access memory (RAM), and/or a non-volatile memory, such as read-only memory (ROM). The memory 24 may store a variety of information and may be used for various purposes. For example, the memory 24 may store the firmware for the device 10, such as an operating system, other programs that enable various functions of the device 10, user interface functions, processor functions, and may be used for buffering or caching during operation of the device 10.

The non-volatile storage 26 of device 10 of the presently illustrated embodiment may include ROM, flash memory, a hard drive, or any other suitable optical, magnetic, or solid-state storage medium, or a combination thereof. The storage 26 may store data files such as media (e.g., music and video files), software (e.g., for implementing functions on device 10), preference information (e.g., media playback preferences), lifestyle information (e.g., food preferences), exercise information (e.g., information obtained by exercise monitoring equipment), transaction information (e.g., information such as credit card information), wireless connection information (e.g., information that may enable the device 10 to establish a wireless connection, such as a telephone connection), subscription information (e.g., information that maintains a record of podcasts, television shows, or other media to which a user subscribes), telephone information (e.g., telephone numbers), and any other suitable data.

The embodiment illustrated in FIG. 2 also includes one or more card slots 28. The card slots may be configured to receive expansion cards that may be used to add functionality to the device 10, such as additional memory, I/O functionality, or networking capability. Such an expansion card may connect to the device through any type of suitable connector, and may be accessed internally or external to the enclosure 12. For example, in one embodiment, the card may be flash memory card, such as a SecureDigital (SD) card, mini- or microSD, CompactFlash card, Multimedia card (MMC), or the like. Additionally, in an embodiment including mobile telephone functionality, a card slot 28 may receive a Subscriber Identity Module (SIM) card.

The exemplary device 10 depicted in FIG. 2 also includes a network device 30, such as a network controller or a network interface card (NIC). In one embodiment, the network device 30 may be a wireless NIC providing wireless connectivity over any 802.11 standard or any other suitable wireless networking standard. The network device 30 may allow the device 10 to communicate over a network, such as a LAN, WAN, MAN, or the Internet. Further, the device 10 may connect to and send or receive data with any device on the network, such as portable electronic devices, personal computers, printers, and so forth. For example, in one embodiment, the device 10 may connect to a personal computer via the network device 30 to send and receive data files, such as media files. Alternatively, in some embodiments, the portable electronic device may not include a network device 30. In such an embodiment, a NIC may be added into card slot 28 to provide similar networking capability as described above.

Further, the device 10 may also include a power source 32. In one embodiment, the power source 32 may be one or more batteries, such as a Li-Ion battery, may be user-removable or secured to the housing 12, and may or may not be rechargeable. Additionally, the power source 32 may include AC power, such as provided by an electrical outlet, and the device 10 may be connected to the power source 32 via the I/O ports 18.

Figure 3:
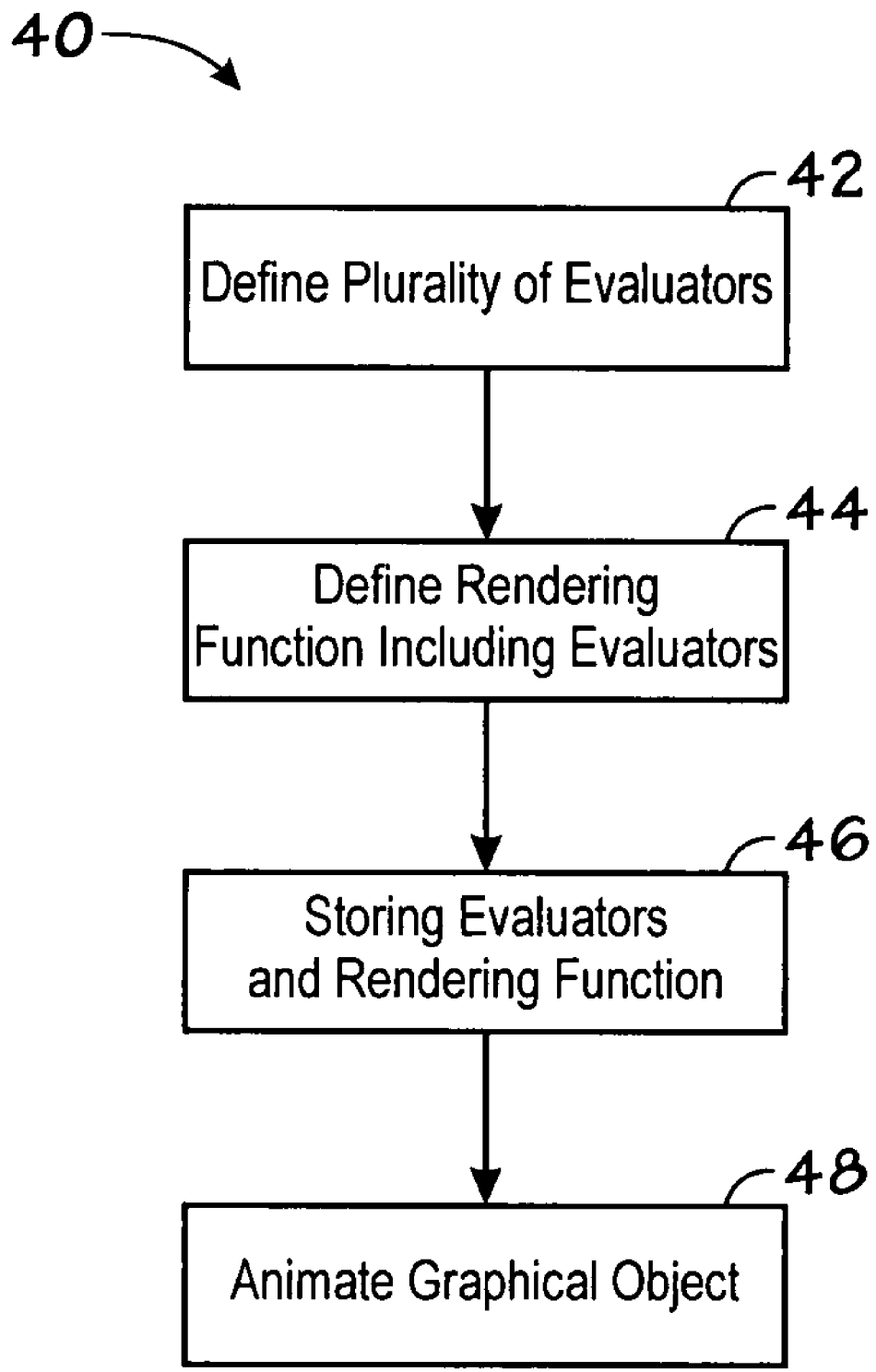
FIG. 3 is a flowchart depicting a process for animating a graphical object in accordance with one embodiment of the present invention.

In should again be noted that various images and data, including graphical data, may be processed and displayed by the device 10. Keeping this in mind, a flowchart of an exemplary method 40 for animating graphical objects is illustrated in FIG. 3 in accordance with one embodiment of the present invention. The exemplary method 40 may include defining a plurality of evaluators associated with a graphical object, as generally indicated in block 42. As used herein, an evaluator is a function that returns a value associated with some operational characteristic of a device or system. In various embodiments, such operational characteristics may include a display characteristic of a graphical object in display screen, a characteristic of a sound generated by the device, an internal property, or the like. In some embodiments, evaluators are components containing a mathematical function that is sampled along with various parameters. For instance, in one embodiment, an evaluator may include a function that calls for a linear interpolation between two values. In this case, the parameters may include a time evaluator that interpolates time from start to end, as well as the beginning and end value for the interpolation. Additionally, in some instances, the evaluators can also be defined recursively. For example, instead of using two constant values for the linear interpolation, the start and/or end points themselves could also be defined as a linear interpolation between two sets of unique values, which may create what is known as a Bezier curve with the fundamental definition of evaluators.

In some embodiments, a basic set of evaluators (e.g., addition, subtraction, multiplication, linear interpolation, trigonometric interpolation, spherical interpolation, or the like) may be defined with various parameters, such as time, or simply two evaluators (i.e., defined recursively). Once a working set of evaluators has been defined, these evaluators may be used in various combinations to create desired effects. Consequently, in one embodiment, a given task (e.g., animating an object, controlling a sound or internal process, or the like) may be accomplished via selection of an appropriate combination of evaluators, rather than requiring the creation of entirely new functions or substantial modification of existing functions. Moreover, in one embodiment, the evaluators can also be used in an animation design tool where each component, or "box", defines a single function that can be combined with other components to perform complex tasks attached to a selected property.

As noted above, in some embodiments, an evaluator may return a constant value, or may include a time-based function such that the value returned by or sampled from the evaluator varies with respect to time. Both constant evaluators and time-varying evaluators may return a value associated with any number of display characteristics of a graphical object. For instance, an evaluator may return a value associated with the position, size, velocity, acceleration, color, opacity, or some other characteristic of the display object. Specific exemplary uses of some such evaluators are discussed below with respect to FIGS. 4-6.

The exemplary method 40 may also include defining a control function, such as a rendering function (in those embodiments relating to control of graphical animation), that includes such evaluators, as generally indicated in block 44. In other embodiments, however, the control function may be defined to modify other, non-display characteristics, such as those noted above. In the presently illustrated embodiment, the method 40 also includes storing the evaluators and the rendering (or other control) function, as generally depicted in block 46. As will be appreciated, the evaluators and the rendering function may be stored in any suitable memory and/or storage device, such as the memory 24 and/or the non-volatile storage 26 of device 10, as described above. In some embodiments, the method 40 may also include animating a graphical object via the rendering function, as generally provided in block 48. In various embodiments, the animated graphical object may be a photograph, cover art, avatars, icons, an individual pixel, or any other desired graphical or image object.

While numerous aspects of a graphical object may be manipulated via the evaluators and the rendering function noted above, specific examples of such evaluators and animation are discussed below with reference to FIGS. 4-6 for illustrative purposes. It will be appreciated, however, that these examples are merely provided for the sake of clarity, and other animations and operations may be performed via evaluators in full accordance with the present techniques.

Figure 4:
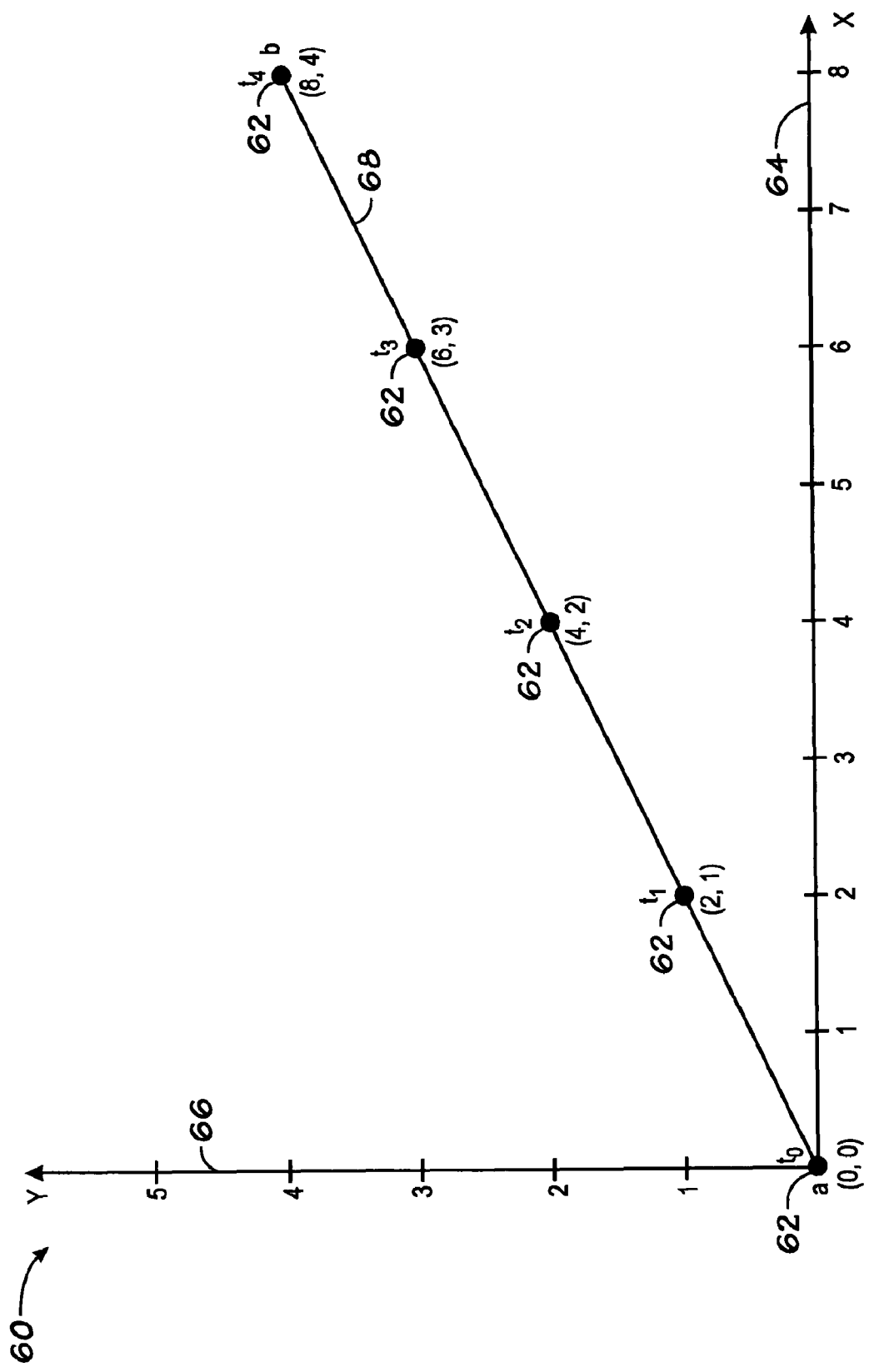
FIG. 4 illustrates the animation of a graphical object through use of an evaluator accordance with one embodiment of the present invention.

With reference to an exemplary graph 60 of FIG. 4, and by way of example, it may be desirable to animate a graphical object 62 from a starting point (a) to a destination point (b) over a desired period of time (t). Although the graph 60 is generally illustrated as a two-dimensional rectangular coordinate system, with units of distance along the horizontal and vertical axes 64 and 66, respectively, it will be appreciated that the present techniques may also be applied in various other coordinate systems, including a three-dimensional system. In the exemplary graph 60, point a is located at coordinates (0,0) and point b is located at coordinates (8,4). In one embodiment, an evaluator "A" may be defined to return the location of point a, and an evaluator "B" may be defined to return the location of point b. A rendering function for animating the graphical object 62 from point a to point b may then be defined as a linear interpolation from the value returned by evaluator A to the value returned by evaluator B over a desired period of time, such as four seconds, or:

$$R(t)=lerp(A,B), \text{ over } t=0 \text{ to } t=4.$$

In this embodiment, execution of the rendering function results in the movement of the graphical object 62 from point a to point b along a path 68 over the course of four seconds. Thus, counting in one second intervals (e.g., times $t_1$, $t_2$, $t_3$, and $t_4$), the graphical object 62 may be located at coordinates (2,1), (4,2), (6,3), and (8,4) at respective times $t_1$, $t_2$, $t_3$, and $t_4$.

Figure 5:
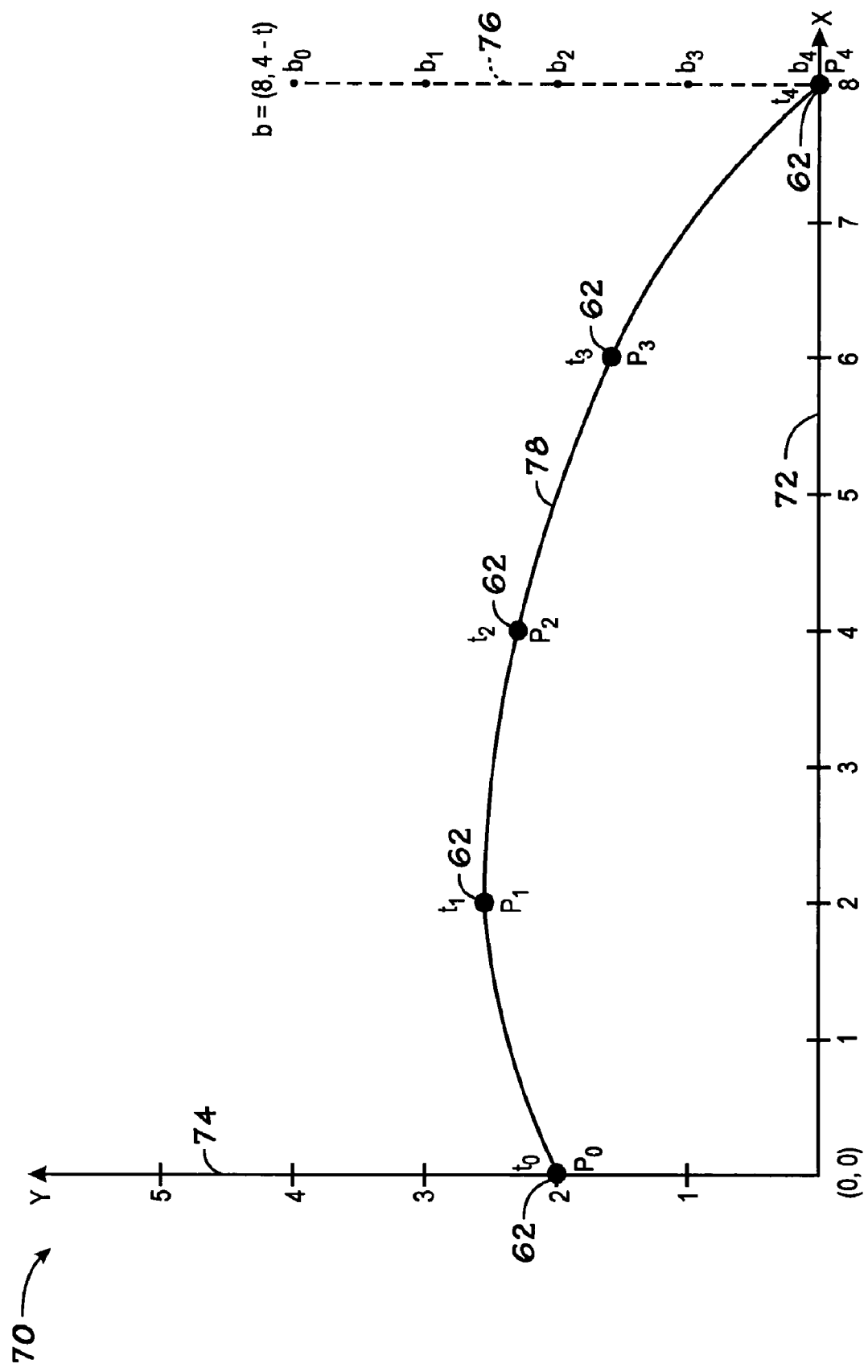
FIG. 5 generally depicts the movement of a graphical object through use of a time-varying evaluator in accordance with one embodiment of the present invention.

In another embodiment, the evaluators may be used to render a more complex animation effect, as generally illustrated in the exemplary graph 70 of FIG. 5. As in graph 60, graph 70 may be a two-dimensional rectangular coordinate system with horizontal and vertical axes 72 and 74, respectively. In this embodiment, however, rather than defining evaluators A and B as functions that return set points and/or values, evaluator A may be defined to return the location of the graphical object 62 at a given time, and the evaluator B may defined as a linear time-based function that returns the location of a point b that moves with respect to time along a path 76, as generally indicated in FIG. 5. Further, an evaluator "D" may be defined as a recursive linear interpolation function over a given time period, such as four seconds. With the evaluators defined in this manner, the rendering function:

$$R(t)=D(A,B), \text{ over } t=0 \text{ to } t=4,$$

may result in the animation of the graphical object 62 along a path 78, as also generally illustrated in FIG. 5.

Figure 6:
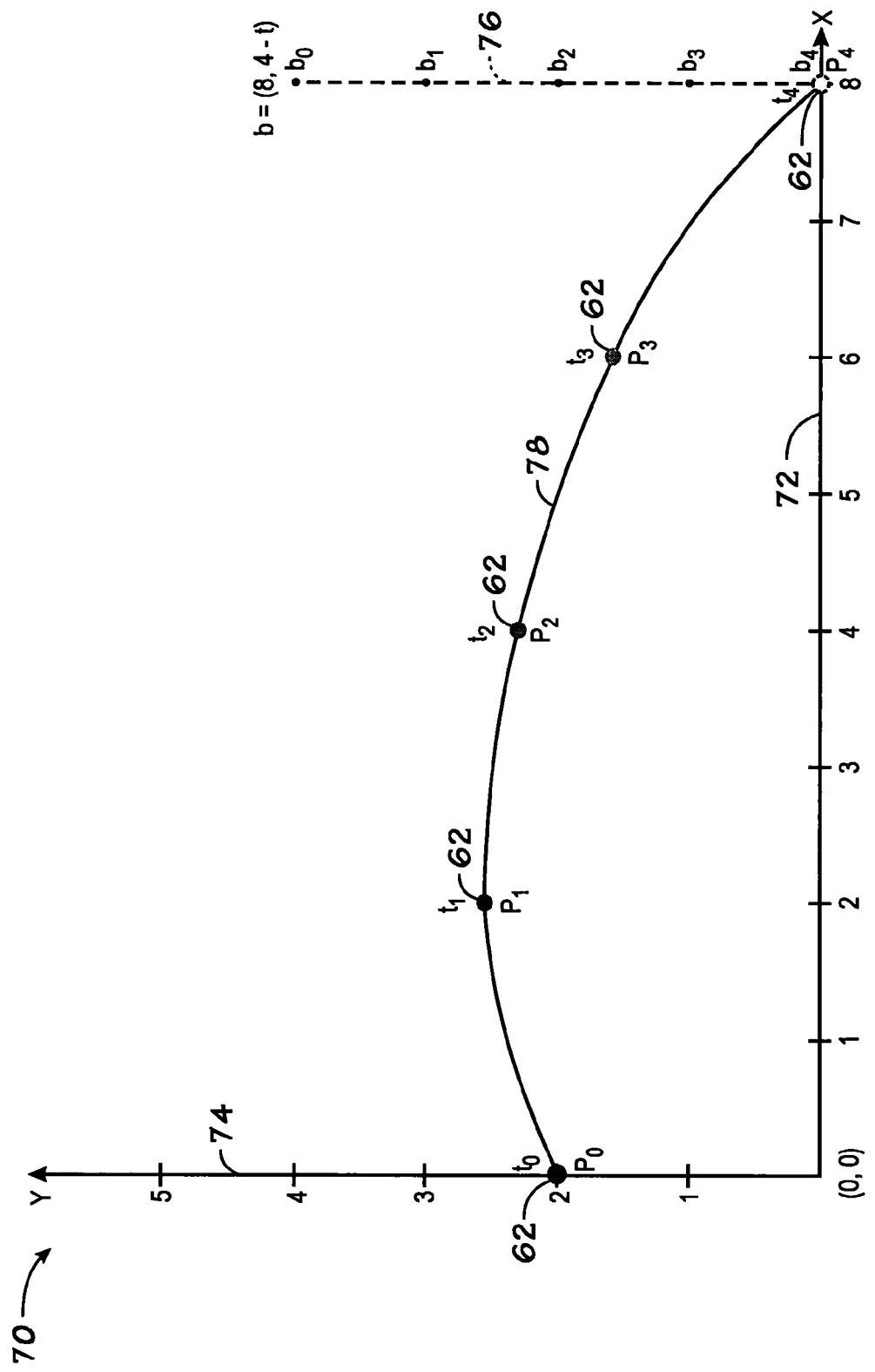
FIG. 6 depicts the animation of a graphical object in which values for the location of the object and the opacity of the object are output from time-dependent evaluators in accordance with one embodiment of the present invention.

Further, additional evaluators may be defined and utilized by the rendering function to adjust other display characteristics of the graphical object 62. For example, an evaluator "C" may be defined to control the opacity of the graphical object 62 over a period of time. For instance, the evaluator C may include the function:

$$f(t)=(4-t)/4, \text{ from } t=0 \text{ to } t=4$$

such that the evaluator returns an opacity value between 0 and 1, inclusive, where an opacity value of 1 corresponds to fully opaque and the opacity value 0 corresponds to fully transparent (i.e., not visible). The rendering function for the graphical object 62 may then be defined as:

$$R(t)=[D(A,B)],C; \text{ from } t=0 \text{ to } t=4,$$

resulting in the gradual fading of the graphical object 62 as it travels along the path 78, as generally illustrated in FIG. 6. Particularly, as the evaluator C includes a linear function from fully opaque to fully transparent, the graphical object is fully opaque at its initial position $P_0$ at time $t_0$, is 75% opaque at position $P_1$, and time $t_1$, 50% opaque position $P_2$ and time $t_2$, 25% opaque at position $P_3$ and time $t_3$, and is fully transparent at position $P_4$ and time $t_4$. As noted above, while these particular examples have been provided for illustrative purposes, it will be appreciated that a wide array of various characteristics, whether display characteristics or other characteristics, may be adjusted through the use of evaluators and/or rendering functions via the techniques described above. Further, while linear interpolations were implemented in some of the evaluators discussed above, it will be appreciated that other forms of interpolation, such as polynomial, exponential, trigonometric, logarithmic, or the like, may be used in full accordance with the present techniques.

Figure 7:
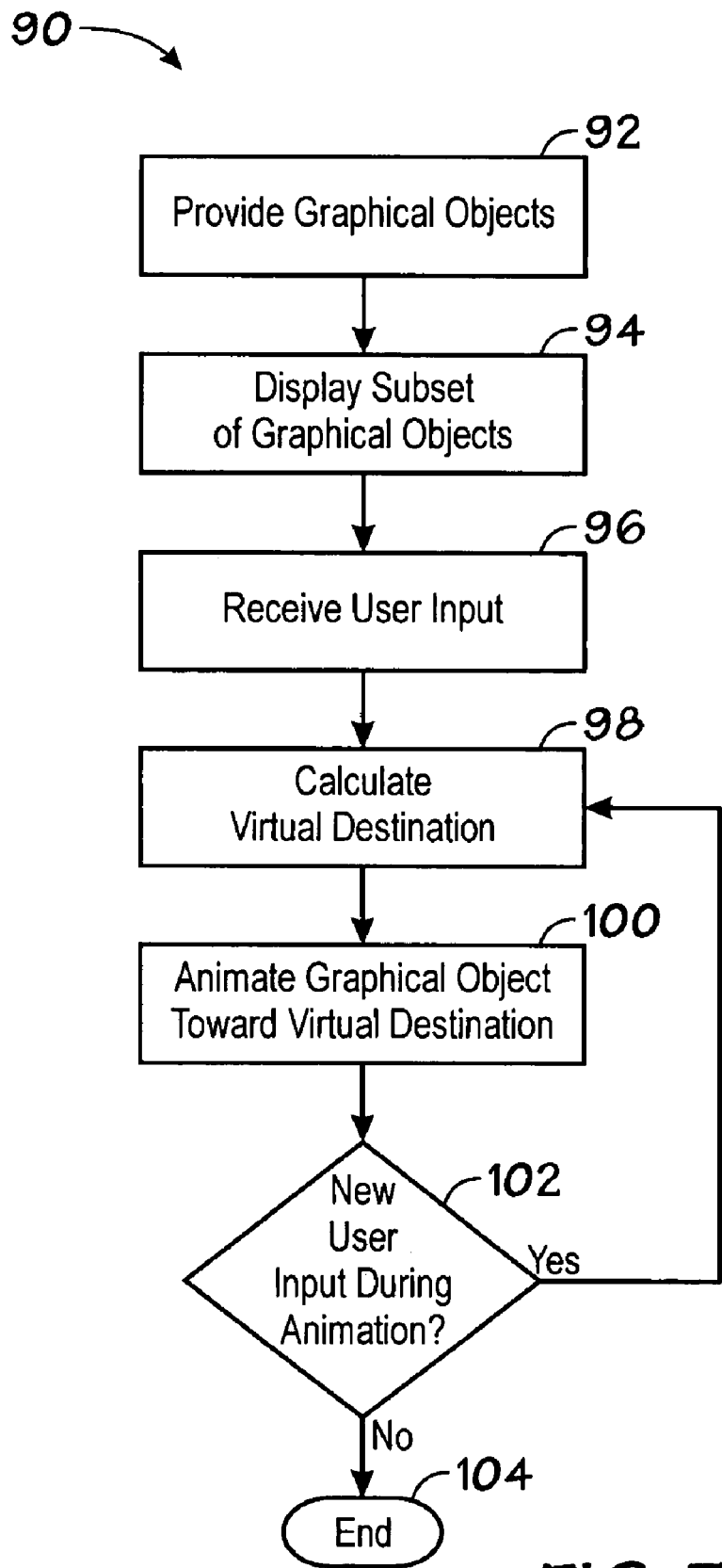
FIG. 7 is a flowchart depicting a process for animating a series of images in accordance with one embodiment of the present invention.

An exemplary method 90 for animating a series of graphical objects or images is depicted in FIG. 7. In one embodiment, the method 90 includes providing a plurality of graphical objects or images, and displaying a subset or a portion of the graphical objects in a viewport of the display, such as the display 14 of the device 10, as generally indicated in blocks 92 and 94. In various embodiments, the graphical objects may include photographs, icons, avatars, cover art, or the like, which a user may be able to browse through by panning or scrolling through the plurality of graphical objects.

In one embodiment, the exemplary method 90 includes receiving a user input, such as via a user input structure 16, and calculating a virtual destination for one or more displayed graphical objects based on the user input, as generally indicated in blocks 96 and 98 of FIG. 7. In some embodiments, the user input structure 16 is a touch-sensitive device, and the calculation of the virtual destination depends on some aspect of the user interaction with the touch-sensitive device. For instance, a fast motion by a user against the touch-sensitive input device may result in the calculation of a virtual destination that is further from the graphical object that that which would be calculated in response to a slower motion. It should be noted that, as used herein, the term "virtual destination" refers to a calculated destination for an image object, and may include an actual display position within the viewport or a virtual display position falling outside the edges of the viewport, as discussed in greater detail below with respect to FIGS. 8-13.

Once the virtual destination is calculated for a graphical object, the graphical object may be animated toward its virtual destination over any desired time period, as generally indicated in block 100. If an additional user input is received during animation of the graphical object toward its virtual destination (block 102), a new, updated virtual destination for the graphical object may be calculated based on the new user input and the graphical object may proceed from its present location to its new virtual destination over a new time period. In one embodiment, the receipt of a new user input during an animation sequence initiated by a previous user input results in the cancellation of the original animation sequence and the beginning of a new animation sequence. Such cancellation may be performed such that the graphical object is essentially "handed-off" from the first animation sequence to the second animation sequence without any, or any significant, perceptible break in the animation of the graphical object from its original position to its updated virtual destination.

In some embodiments, the time periods associated with the animation sequences in response to original and new user inputs may be substantially equivalent, although differing time periods may be used in full accordance with the present techniques. The moving or animating of the graphical object may be performed according to a function including an evaluator, such as generally described above with respect to FIGS. 3-6. With or without the use of evaluators, such animation may also be performed through interpolation between the location the graphical object prior to receipt of the user input and the virtual destination calculated following the user input. In one embodiment, such interpolation is a linear interpolation, although other forms of interpolation, such as polynomial, exponential, trigonometric, or the like, may be used. Once the graphical object reaches its virtual destination, the method 90 ends (block 104).

Figure 8:
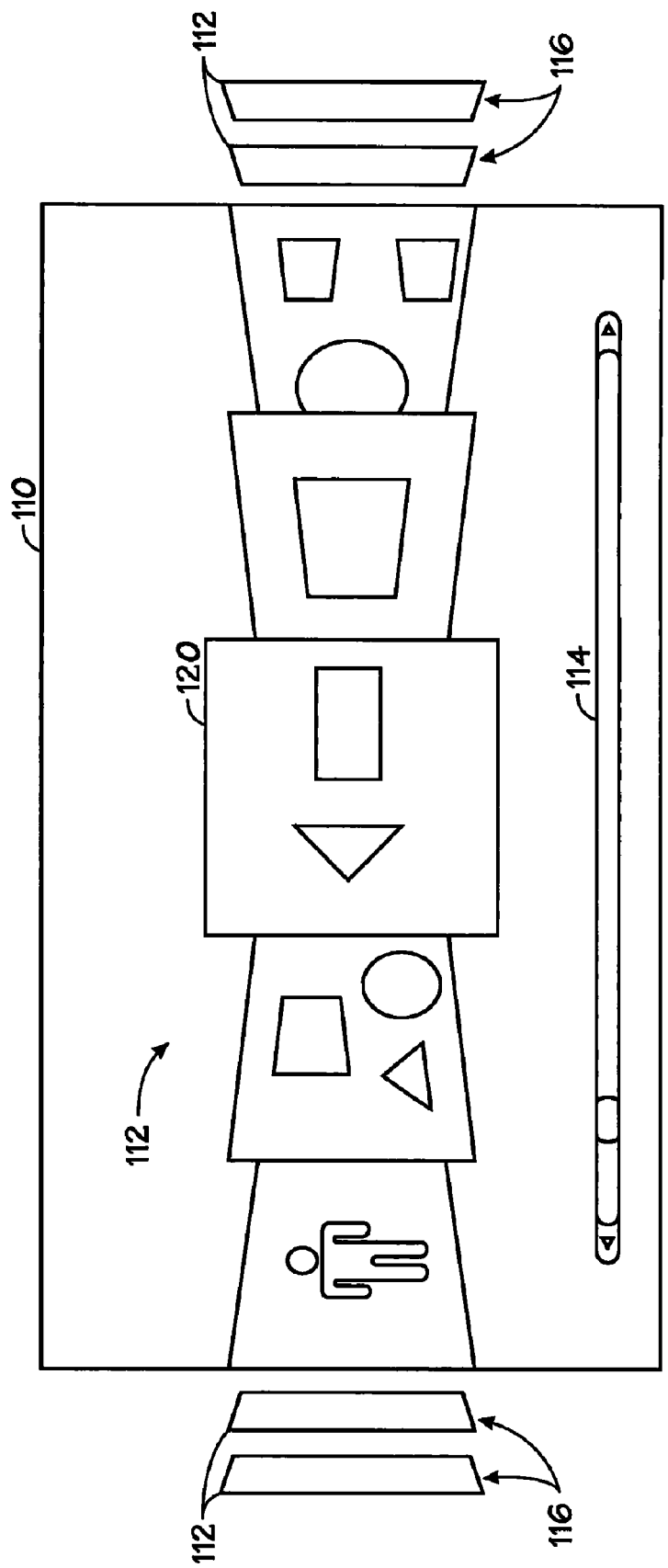
FIG. 8 illustrates an exemplary viewport including images that include cover art associated with one or more media files in accordance with one embodiment of the present invention.

An exemplary viewport 110, in which graphical objects may be displayed, is provided in FIG. 8. In some embodiments, the viewport 110 may be provided on the display 14. As noted above, the viewport 110 may display a subset of a plurality of graphical objects 112, such as cover art, photos, or the like. In one embodiment, the viewport 110 may be configured to display a subset of the plurality of graphical objects 112, wherein the subset is of a certain size. For instance, in the presently illustrated embodiment, the viewport 110 is generally configured to display five graphical or image objects 112, although a greater or lesser number of such objects may be displayed within the viewport 110 in other embodiments. Additionally, a user may scroll or pan through the graphical objects 112 via the scroll bar 114. As the viewport 110 displays only a subset of the graphical objects 112, other graphical objects 112 may be considered to be in virtual positions 116 (i.e., positions that are not displayed in the viewport 110) on either side of the viewport 110.

The animation of a particular graphical or image object 120 of the plurality of graphical objects 112 may be better understood with reference to the diagrams illustrated in FIGS. 9-13. For example, the diagram 124 of FIG. 9 generally illustrates a plurality of graphical objects $O_1$-$O_{20}$ and their respective location with respect to a series of positions 126 ($P_5$-$P_{37}$) in accordance with one embodiment. The depiction of the graphical objects 112 in FIG. 9 generally corresponds to that of FIG. 8, with the particular graphical object 120 occupying a generally central position within the viewport 110. In the presently illustrated embodiment, the positions $P_{20}$-$P_{24}$ generally correspond to the actual display positions of the subset of the graphical objects 112 within the viewport 110, while the remaining positions 126 may be considered to be virtual positions as discussed above.

Once a user input is received, a virtual destination 130, at a distance $x_1$ from a starting location 132 (at $P_{22}$) of the graphical object 120 may be calculated. The graphical object 120 may then be moved or animated from the location 132 to the virtual destination 130 over a given period of time, such as one second, three seconds, or some other amount of time. At the conclusion of such animation, the sequence of graphical objects 112 may be located within the positions 126 as illustrated in diagram 136 of FIG. 10. As illustrated in the exemplary diagram 136, the plurality of graphical objects 112 have been shifted to the right with respect to the viewport 110, such that the graphical object 120 is now located at its virtual destination 130, while an additional graphical object 138 has been animated into the location 132 previously occupied by the graphical 120 prior to the animation. As noted above, the virtual destination calculated for a given graphical object 112 may correspond to an actual display position within the viewport 110 or a virtual position outside of the viewport 110.

In an additional embodiment, an additional user input may be received during animation of the graphical object 120 from its starting location 132 to its virtual destination 130, as generally illustrated in diagram 142 of FIG. 11. In such an embodiment, the graphical object 120 may have only traversed a portion of the distance $x_1$ between the starting location 132 and the virtual destination 130 when the additional user input is received. For instance, if the graphical object 120 is to be animated from the location 132 to the virtual destination 130 over a period of one second, an additional user input may be received 0.4 seconds into the animation, at which time the graphical objects 112 are generally located in the positions illustrated in the diagram 144 of FIG. 12. Notably, at the time of receipt of new user input, the graphical object 120 is located at a position 146 and a new, updated virtual destination 148 may be calculated based on the new user input. Subsequently, the graphical object 120 may be animated from the location 146 to the updated virtual destination 148, as generally illustrated in the exemplary diagram 152 of FIG. 13.

Additionally, although the examples provided above include the movement of the graphical object 120 (in accordance with a calculated virtual destination) from an actual display position within the viewport 110 to a virtual display position outside of the viewport 110 (FIGS. 9 and 10), and from one virtual display position to another (FIGS. 12 and 13), it should be noted that other types of movement may also be performed in other embodiments. For instance, in other embodiments, a graphical object may be animated from its virtual display position to an actual display position, or between two actual display positions, in full accordance with the present techniques. Still further, a graphical object may be animated from a virtual display position on one side of the viewport 110 to a virtual display position on the opposite side of the viewport 110.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method comprising:
defining a plurality of evaluators associated with respective operational characteristics of a device;
defining a control function dependent on time and including first and second evaluators of the plurality of evaluators, wherein at least one of the first or second evaluators includes an additional function dependent on time; and
storing the plurality of evaluators and the control function in a memory of the device, wherein the device is configured to vary the operational characteristics associated with the first and second evaluators based at least in part on the control function;
wherein the operational characteristics associated with the first and second evaluators comprise one or more display characteristics of a graphical object, the control function comprises a rendering function, and the device is configured to animate the graphical object and to vary the one or more display characteristics associated with the first and second evaluators during animation of the graphical object based at least in part on the rendering function; wherein the rendering function comprises a recursive interpolation function for animating the graphical object between a source position and a target position; and wherein the target position is defined at least in part by one of the first or second evaluators including the additional function dependent on time such that the target position varies with respect to time, and the graphical object is animated from the source position to the target position over a period of time such that the graphical object arrives substantially at the current target position at the end of the period of time.

2. The method of claim 1, wherein the one or more display characteristics associated with the first and second evaluators comprise a position of the graphical object.

3. The method of claim 1, wherein the additional function dependent on time includes at least one of a linear function, a polynomial function, an exponential function, a logarithmic function, or a trigonometric function.

4. The method of claim 1, wherein the rendering function is configured to adjust a plurality of display characteristics of the graphical object via evaluators, the display characteristics comprising two or more of position, velocity, acceleration, size, opacity, or color.

5. The method of claim 1, wherein the first and second evaluators of the control function operate concurrently.

6. A method comprising:
providing a plurality of graphical objects;
displaying a subset of the plurality of graphical objects in a viewport of a display;
receiving a user input;
calculating a virtual destination for at least one graphical object of the subset based on the user input; and
moving the at least one graphical object to the virtual destination over a time period, wherein moving the at least one graphical object comprises moving the at least one graphical object from an actual display position within the viewport to a virtual display position.

7. The method of claim 6, comprising:
receiving an additional user input during the time period;
updating the virtual destination for the at least one graphical object based on the additional user input; and
moving the at least one graphical object to the updated virtual destination over an additional time period.

8. The method of claim 6, wherein moving the at least one graphical object comprises moving the at least one graphical object according to a function including an evaluator.

9. The method of claim 6, wherein moving the at least one graphical object comprises moving the at least one graphical object according to an interpolation between its original position and its virtual destination.

10. The method of claim 6, wherein the interpolation comprises a linear interpolation.

11. The method of claim 6, wherein the virtual destination is outside of the viewport.

12. The method of claim 6, comprising:
calculating virtual destinations for each graphical object of the plurality of graphical objects based on the user input; and
animating the sequence of graphical objects of the plurality of graphical objects within the viewport over the time period such that each graphical object of the plurality of graphical objects is moved to its respective virtual destination over the time period.

13. A device comprising:
a housing;
a display disposed in the housing;
a memory device disposed in the housing, the memory device including executable application instructions stored therein; and
a processor disposed in the housing and configured to execute the application instructions stored in the memory device;
wherein the device is configured to pan through a plurality of images in response to a user input, at least one image is moved over a period of time to a virtual destination that is calculated from the user input, and the at least one image is moved at least between a virtual display position outside of the display and an actual display position within the display.

14. The device of claim 13, wherein the device comprises a touch-sensitive user interface, and the virtual destination calculated depends on the speed of user movement on the touch-sensitive interface.

15. The device of claim 13, wherein the plurality of images comprises at least one of a photograph or cover art for a media file.

16. One or more machine-readable storage media having application instructions encoded thereon, the application instructions comprising:
instructions for displaying a portion of a sequence of images;

instructions for calculating a virtual destination for a particular image of the sequence of images based on a user input; and instructions for animating the sequence of images over a first time period such that the particular image arrives at its virtual destination at the end of the first time period.

17. The one or more machine-readable storage media of claim 16, wherein the application instructions comprise instructions for updating the virtual destination in response to an additional user input, wherein the instructions for updating comprise instructions to cancel any animation process remaining for the first time period in favor of a new animation process to move the particular image to the updated virtual destination over a second time period.

18. The one or more machine-readable storage media of claim 16, wherein the one or more machine-readable storage media comprise a flash memory device.

* * * * *